United States Patent
Van Beek (10) Patent No.: US 8,711,938 B2
(45) Date of Patent: Apr. 29, 2014

(54) METHODS AND SYSTEMS FOR MOTION ESTIMATION WITH NONLINEAR MOTION-FIELD SMOOTHING

(75) Inventor: Petrus J. L. Van Beek, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 706 days.

(21) Appl. No.: 12/554,809

(22) Filed: Sep. 4, 2009

(65) Prior Publication Data

US 2011/0058610 A1    Mar. 10, 2011

(51) Int. Cl.
*H04N 7/12*          (2006.01)

(52) U.S. Cl.
USPC ............ 375/240.16; 375/240.01; 348/154; 348/402.1; 348/699

(58) Field of Classification Search
USPC ........... 375/240.01, 240.16; 348/154, 402.1, 348/699
See application file for complete search history.

(56) References Cited

U.S. PATENT DOCUMENTS

| | | | |
|---|---|---|---|
| 6,628,715 | B1 | 9/2003 | Iu et al. |
| 6,968,074 | B1 | 11/2005 | Kondo et al. |
| 8,019,123 | B2 | 9/2011 | Mishima et al. |
| 2004/0037358 | A1 | 2/2004 | Comer |
| 2006/0023790 | A1 | 2/2006 | Tsai et al. |
| 2007/0092122 | A1 | 4/2007 | Xiao et al. |
| 2008/0204592 | A1 | 8/2008 | Jia et al. |
| 2009/0167904 | A1 | 7/2009 | Matsushima |
| 2011/0211637 | A1* | 9/2011 | Blum .................. 375/240.16 |

FOREIGN PATENT DOCUMENTS

| | | |
|---|---|---|
| JP | 2000-348187 A | 12/2000 |
| JP | 2008-226187 A | 9/2008 |
| JP | 2009-157647 A | 7/2009 |

OTHER PUBLICATIONS

Jiangjian Xiao, Hui Cheng, Hapreet Sawhney, Cen Rao and Michael Isnardi, "Bilateral Filtering-based Optical Flow Estimation with Occlusion Detection," in Proceedings 9th European Conference on Computer Vision (ECCV 2006), May 2006, Graz, Austria.

Jong-Sen Lee, "Digital Image Smoothing and the Sigma Filter," Computer Vision, Graphics, and Image Processing, 1983, pp. 255-269, vol. 24.

Japanese Office Action—Patent Application No. 2010-196476—Mailing Date Feb. 7, 2012.

Chinese Office Action—Application No. 201010261093.5—Issuing Date: Sep. 13, 2012.

(Continued)

*Primary Examiner* — Nicholas Sloms
(74) *Attorney, Agent, or Firm* — Kristine Elizabeth Matthews; David C. Ripma (57) ABSTRACT

Aspects of the present invention are related to low complexity systems and methods for nonlinear diffusion filtering of a motion-vector field. Local weights in the nonlinear diffusion filter may be data-adaptive, and, according to one aspect of the present invention, may be determined such that spatial coherency may not be enforced at object boundaries although the object boundaries have not been explicitly detected. Thus, the methods and systems of the present invention may smooth a motion-vector field without smoothing the motion-vector field across an object boundary. According to a second aspect of the present invention, motion vectors with a low confidence value may be suppressed, while motion vectors with a high confidence value may be propagated. According to another aspect of the present invention, motion estimation methods and systems may incorporate the methods and systems of the nonlinear diffusion filtering according to the present invention.

28 Claims, 6 Drawing Sheets

(56) References Cited

OTHER PUBLICATIONS

C. Tomasi and R. Manduchi, "Bilateral Filtering for Gray and Color Images," Proceedings of the 1998 IEEE International Conference on Computer Vision, Bombay, India, Jan. 7, 1998, pp. 839-846.

Jiangjian Xiao, Hui Cheng, Harpreet Sawhney, Cen Rao and Michael Isnardi, "Bilateral Filtering-based Optical Flow Estimation with Occlusion Detection," ECCV, vol. I, 2006, pp. 211-224.

* cited by examiner

METHODS AND SYSTEMS FOR MOTION ESTIMATION WITH NONLINEAR MOTION-FIELD SMOOTHING

FIELD OF THE INVENTION

Embodiments of the present invention relate generally to methods and systems for motion estimation, and in particular, to methods and systems for motion estimation with motion-field smoothing.

BACKGROUND

In motion estimation, also referred to as optical-flow estimation and displacement estimation, the correspondences between areas in different video frames, also referred to as images, in a video sequence may be determined. The motion of objects in the actual scene captured in the video sequence, in addition to camera motion, may result in moving visual patterns in the video frames. A goal of true motion estimation may be to estimate the two-dimensional (2D) motion of a visual pattern from one frame to another such that the estimated 2D motion may be the projection of the actual three-dimensional (3D) scene motion. Local motion estimation may refer to estimation of a motion vector for a small image area, for example, a single pixel or a small block of pixels. Exemplary small blocks may be 2×2, 4×4, 8×8 and other blocks containing a small number of pixels. A set of motion vectors for all pixels, or pixel blocks, across an entire image, or video frame, may be referred to as a motion field. The estimated motion field may be used in applications in many areas, for example, video processing, video coding, computer vision and other video and imaging areas. Exemplary applications may include motion-compensated video coding, motion-compensated video filtering and motion-compensated frame interpolation.

Gradient-based motion estimation may be one important class of motion estimation methods. In gradient-based motion estimation, local motion may be modeled as substantially constant in a neighborhood proximate to a pixel location where a motion vector may be estimated. The neighborhood may be referred to as a local analysis window, analysis window or window. Spatial and temporal derivative values, also referred to as spatio-temporal gradients, of the pixel data in the window may be determined and used to compute a motion vector, a displacement vector or other parameters corresponding to the associated motion.

Another important class of motion estimation methods may be block matching. In block matching, a block of pixels in one frame may be matched to a block of pixels in another frame by searching, in a pre-defined region, among candidate blocks of pixels.

Assumptions used in most motion models may not hold at all image locations, thereby making motion estimation a very challenging problem, both in theory and in practice. For example, an often assumed basic assumption that the color, the intensity or the brightness of a pixel, or block of pixels, is preserved from one video frame to the next may not hold due to the 3D nature of the actual objects in the scene and their associated illumination. Additionally, a reliable solution may not be accessible when the data may not sufficiently constrain the motion model, for example, when the color or intensity function may be locally very flat or one-dimensional, a problem referred to as the aperture problem. Furthermore, areas in one image may not appear in another image due to occlusions, for example, background areas that may be covered or uncovered by a moving foreground object.

The potential presence of multiple objects within an analysis window may generate problems with a gradient-based motion estimation approach, wherein local motion may be modeled to be substantially constant in a neighborhood, due to the possibility of each of the multiple objects being associated with differing motion within the captured scene. The presence of multiple motions within the analysis window may lead to inaccurate estimates of the motion vector, or other motion parameters, being estimated.

Additionally, the data within an analysis window may comprise one or more noise components due to, for example, camera noise, compression noise or other noise. The noisy data within an analysis window may lead to inaccurate motion vector, or other motion parameter, estimates. This problem may be especially apparent when the analysis window is not sufficiently large enough to ensure accurate motion estimation.

Regularization may be applied to the estimation of motion-vector fields in an attempt to mitigate for the above-described and other problems. Regularization may use an assumption, for example, that of spatial coherency, to constrain the estimation. The concept of spatial coherency states that real-world surfaces have a spatial extent and areas on a single surface are likely to moving with the same or very similar motion. The spatial coherency concept leads to the introduction of a motion smoothness constraint. However, the assumption of spatial coherency does not hold at motion boundaries, which often coincide with object boundaries, and may lead to motion fields that are too smooth, especially at motion boundaries.

Computationally efficient systems and methods for motion estimation that improve spatial coherency of a motion field without over-smoothing the motion field at a motion boundary and that do not require explicit occlusion detection may be desirable.

SUMMARY

Some embodiments of the present invention comprise methods and systems for nonlinear diffusion filtering of a motion field.

According to one aspect of the present invention, data-adaptive filter weights at each location in the filter support may be determined based on the difference of the image value at the location in the filter support and the image value at the location associated with the center of the filter support.

According to another aspect of the present invention, data-adaptive filter weights at each location in the filter support may be based on a confidence-measure value associated with the motion vector at the location in the filter support.

According to yet another aspect of the present invention, data-adaptive filter weights may be a combination of data-adaptive filter weights determined in accordance with the above-described aspects of the present invention.

Some embodiments of the present invention comprise methods and systems for motion estimation comprising nonlinear diffusion filtering of a motion field according to aspects of the present invention.

The foregoing and other objectives, features, and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

In motion estimation, also referred to as optical-flow estimation and displacement estimation, the correspondences between areas in different video frames, also referred to as images, in a video sequence may be determined. The motion of objects in the actual scene captured in the video sequence, in addition to camera motion, may result in moving visual patterns in the video frames. A goal of true motion estimation may be to estimate the two-dimensional (2D) motion of a visual pattern from one frame to another such that the estimated 2D motion may be the projection of the actual three-dimensional (3D) scene motion. Local motion estimation may refer to estimation of a motion vector for a small image area, for example, a single pixel or a small block of pixels. Exemplary small blocks may be 2×2, 4×4, 8×8 and other blocks containing a small number of pixels. A set of motion vectors for all pixels, or pixel blocks, across an entire image, or video frame, may be referred to as a motion field. The estimated motion field may be used in applications in many areas, for example, video processing, video coding, computer vision and other video and imaging areas. Exemplary applications may include motion-compensated video coding, motion-compensated video filtering and motion-compensated frame interpolation.

Gradient-based motion estimation may be one important class of motion estimation methods. In gradient-based motion estimation, local motion may be modeled as substantially constant in a neighborhood proximate to a pixel location where a motion vector may be estimated. The neighborhood may be referred to as a local analysis window, analysis window or window. Spatial and temporal derivative values, also referred to as spatio-temporal gradients, of the pixel data in the window may be determined and used to compute a motion vector, a displacement vector or other parameters corresponding to the associated motion.

Another important class of motion estimation methods may be block matching. In block matching, a block of pixels in one frame may be matched to a block of pixels in another frame by searching, in a pre-defined region, among candidate blocks of pixels.

Assumptions used in most motion models may not hold at all image locations, thereby making motion estimation a very challenging problem, both in theory and in practice. For example, an often assumed basic assumption that the color, the intensity or the brightness of a pixel, or block of pixels, is preserved from one video frame to the next may not hold due to the 3D nature of the actual objects in the scene and their associated illumination. Additionally, a reliable solution may not be accessible when the data may not sufficiently constrain the motion model, for example, when the color or intensity function may be locally very flat or one-dimensional, a problem referred to as the aperture problem. Furthermore, areas in one image may not appear in another image due to occlusions, for example, background areas that may be covered or uncovered by a moving foreground object.

The potential presence of multiple objects within an analysis window may generate problems with a gradient-based motion estimation approach, wherein local motion may be modeled to be substantially constant in a neighborhood, due to the possibility of each of the multiple objects being associated with differing motion within the captured scene. The presence of multiple motions within the analysis window may lead to inaccurate estimates of the motion vector, or other motion parameters, being estimated.

Additionally, the data within an analysis window may comprise one or more noise components due to, for example, camera noise, compression noise or other noise. The noisy data within an analysis window may lead to inaccurate motion vector, or other motion parameter, estimates. This problem may be especially apparent when the analysis window is not sufficiently large enough to ensure accurate motion estimation.

Regularization may be applied to the estimation of motion-vector fields in an attempt to mitigate for the above-described and other problems. Regularization may use an assumption, for example, that of spatial coherency, to constrain the estimation. The concept of spatial coherency states that real-world surfaces have a spatial extent and areas on a single surface are likely to moving with the same or very similar motion. The spatial coherency concept leads to the introduction of a motion smoothness constraint. However, the assumption of spatial coherency does not hold at motion boundaries, which often coincide with object boundaries, and may lead to motion fields that are too smooth, especially at motion boundaries.

Computationally efficient systems and methods for motion estimation that improve spatial coherency of a motion field without over-smoothing the motion field at a motion boundary and that do not require explicit occlusion detection may be desirable.

Exemplary embodiments of the present invention described herein may be described in relation to single-channel images for illustrative purposes. The descriptions of these embodiments of the present invention are not to be considered limiting of the scope of the present invention, for the invention may admit to other equally effective embodiments related to multi-channel, color and other non-single-channel images as would be appreciated by a person having ordinary skill in the art. Additionally, exemplary embodiments of the present invention described herein may be described in relation to a single displacement vector. The descriptions of these embodiments of the present invention are not to be considered limiting of the scope of the present invention, for the invention may admit to other equally effective embodiments related to other motion models, for example, affine motion and other models, as would be appreciated by a person having ordinary skill in the art.

In motion estimation, an identified 2D region in a current image may be associated with a corresponding 2D region in a reference image by a motion vector, a displacement vector or other motion parameters. For illustrative purposes herein, the current image may be denoted f(x,y), and the reference image may be denoted g(x,y), where x and y represent coordinates of a pixel location in an image. The pixel values f(x,y) and g(x,y) may represent gray-levels, luma values or other image-derived values. The two images, the current image and the reference image, may be two frames in a video sequence. The region in the current image may be an area associated with a single pixel location, a rectangular block of pixel locations or an arbitrarily shaped region in the image. Local motion estimation may estimate a motion vector for a small image area, for example, a single pixel or a small block of pixels. Each image area, pixel, block or region, in the current image may be associated with a motion vector. The set of all motion vectors for all image regions may be referred to as a motion-vector field, a motion field, a displacement field or a displacement-vector field. The 2D motion in an image may be also referred to as flow or optical flow.

The differences between a current image and a reference image may be assumed to be due largely to the motion of objects within the captured scene. Thus, a part of an object that is visible in a first image is very likely to be visible in a second image as well, though the object may be possibly displaced according to the projection of its scene motion.

One class of methods that have been widely implemented and used in practical applications, for example, video encoding, video processing and other video applications, is referred to as block matching. In block matching, the current image may be divided into rectangular blocks, and a motion vector may be estimated for each block by searching for a closest-matching block in the reference image.

Another well-known class of methods may be referred to as gradient-based motion estimation. Gradient-based motion estimation also may be referred to as differential motion estimation or optical-flow estimation. In these methods, a motion vector, optical-flow vector or displacement vector may be calculated on the basis of spatial and temporal image derivatives, or image differences. While block matching comprises a search procedure for the best motion vector, gradient-based techniques allow for direct computation of a motion vector.

Motion estimation may be performed in a coarse-to-fine manner, where a coarse motion field may be estimated initially and subsequently refined iteratively. These approaches may be also referred to as multi-scale, multi-resolution, hierarchical or pyramid-based motion estimation. A coarse estimate may be formed at a reduced image resolution. The low-resolution motion field may be then be refined by adding addition detail at subsequent higher resolutions until a desired resolution is achieved. Both block-based and gradient-based motion estimation techniques have been extend to comprise hierarchical methods in the past.

The following notation may be used in describing embodiments of the present invention. A current 2D image, or video frame, may be denoted f(x,y), and a reference 2D image, or video frame, may be denoted g(x,y). A motion vector associated with a location, denoted (i,j), in the current image may be denoted by $v(i,j)=(u(i,j),v(i,j))^T$ and may be referred to as the displacement vector, or motion vector, where u and v are the horizontal and vertical components, respectively. The dependency on (i,j) may be dropped for notational convenience, and the motion vector may be denoted $v=(u,v)^T$.

In some embodiments of the present invention, a motion field may be received at a motion-field filter in a motion-field smoothing system, in a motion-estimation system or any other video-processing system. In some embodiments, the motion field may comprise an initial estimate of motion vectors at a plurality of locations of interest. In alternative embodiments, the motion field may comprise an intermediate estimate, in a coarse-to-fine estimate, of motion vectors at a plurality of locations of interest. A location of interest may be denoted (i,j).

The motion field may be filtered according to embodiments of the present invention using a nonlinear diffusion filter comprising local weighting averaging as follows:

$$u(i,j) = \frac{\sum_{m,n \in \Omega_{i,j}} w(m,n)u(m,n)}{\sum_{m,n \in \Omega_{i,j}} w(m,n)}$$

and $$v(i,j) = \frac{\sum_{m,n \in \Omega_{i,j}} w(m,n)v(m,n)}{\sum_{m,n \in \Omega_{i,j}} w(m,n)},$$

where $\Omega_{i,j}$ is a neighborhood associated with the location of interest (i,j). This neighborhood may also be referred to as the local window, or the filter support, associated with the location of interest. In some embodiments, the window may be substantially centered on the location of the interest (i,j). Thus the window center may be near (i,j), and the location (i,j) may be referred to as the center location in the window. Coordinate indices (m,n) denote locations within the window. The filter coefficients, w(m,n), may be data-adaptive weights determined according to embodiments of the present invention.

In some embodiments of the present invention, the weights may be constrained to an interval, for example, $0.0 \leq w(m,n) \leq 1.0$.

Figure 1:
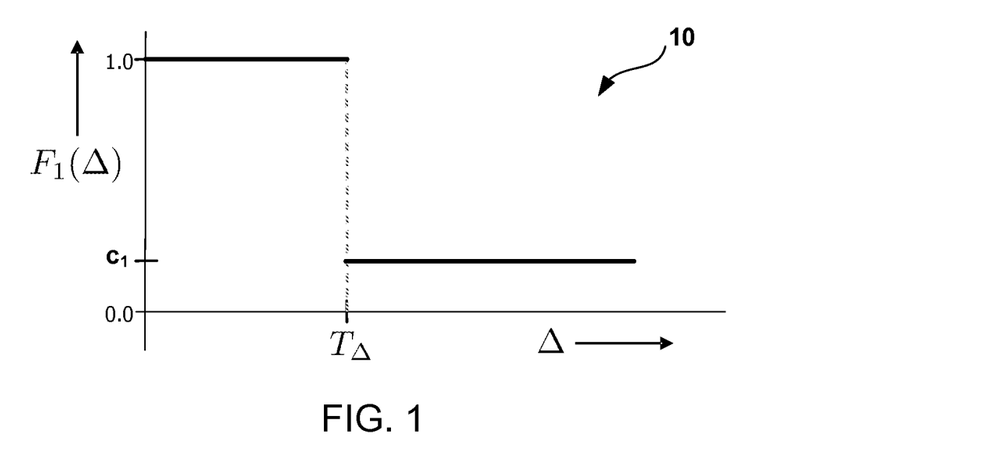
FIG. 1 is a picture illustrating a two-valued piecewise-constant functional relation.

In some embodiments of the present invention, a weight at a location (m,n) may be based on the difference of the image value f(m,n) and the image value f(i,j) at the window center according to:

$$w_1(m,n) = F_1(|f(i,j) - f(m,n)|)$$

where the functional relation $F_1(\cdot)$ may decrease for increasingly larger absolute differences between $f(i,j)$ and $f(m,n)$. The resulting weight value may be close to 1.0 when the absolute difference is small and may decrease to a lower, non-negative value with increasingly larger absolute differences. FIG. 1 illustrates an exemplary such function 10.

In the exemplary function 10 shown in FIG. 1, the weighting is based on a two-valued piecewise-constant function, $F_1(\Delta)$, where $\Delta = |f(i,j) - f(m,n)|$, according to:

$$w_1(m, n) = \begin{cases} 1.0 & \text{if } |f(i, j) - f(m, n)| < T_\Delta \\ c_1 & \text{otherwise,} \end{cases}$$

where $T_\Delta$ is a pre-determined threshold value and $c_1$, where $0.0 \leq c_1 \leq 1.0$, is a pre-determined weight value, for example, in some embodiments, $c_1 = 0.0$ and in alternative embodiments, $c_1 = 0.20$. In an exemplary embodiment, $T_\Delta$ may be selected such that $T_\Delta = 20$. Alternative embodiments may comprise a multi-valued piecewise-constant function $F_1(\cdot)$. In embodiments of the present invention comprising a piecewise-constant function $F_1(\cdot)$, the computational expense and computation resources may be much less than that of prior art methods for motion-field filtering.

The data-adaptive weighting embodiments of the present invention may smooth the motion field in areas of slowly varying pixel intensity, or color values. Near object boundaries, the pixel intensity, or color, may change significantly, which may result in a visible edge in the image. According to embodiments of the present invention, the locations in the filter support that have an image intensity, or a color, value that is significantly different from the image value of the center location will be assigned a significantly lower weight value. Thus, the motion vector at these locations may not contribute significantly to the local weighted average. Thus, a motion field filtered according to embodiments of the present invention may have a sharp edge along an object boundary, since the filter may substantially avoid smoothing across an object boundary. An object boundary may often coincide with a motion boundary, and therefore, the motion field filtered according to embodiments of the present invention may retain a sharp motion boundary.

Figure 2:
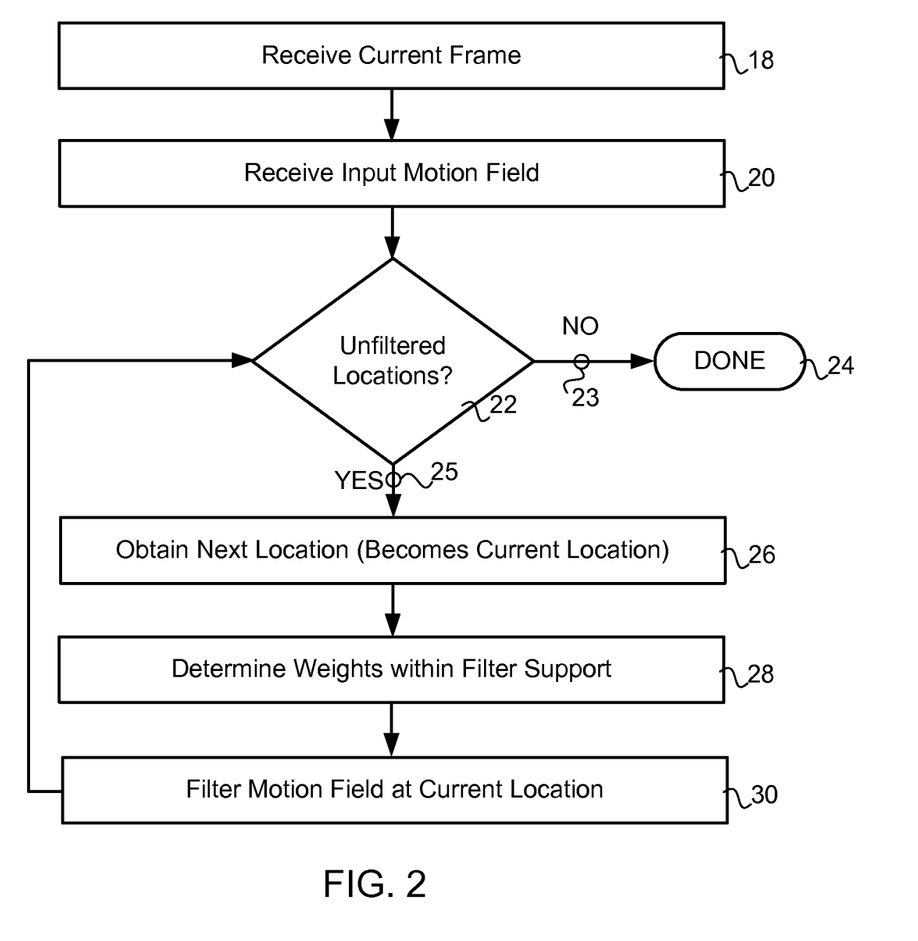
FIG. 2 is a chart showing exemplary embodiments of the present invention comprising determination of a data-adaptive weight at a location based on the difference between the image value at the location and the image value at the center location in the filter support.

Some embodiments of the present invention may be described in relation to FIG. 2. In these embodiments, a current frame, or image, may be received 18 in a computing system associated with a motion-field filter. An input motion field may also be received 20 in the computing system. A determination 22 may be made as to whether or not there remain unfiltered locations in the motion field. If there are no 23 unfiltered locations, then the filtering may terminate 24. If there are remaining 25 unfiltered locations, then the next location may be obtained 26, and it may become the current location. Weights may be determined 28, for all locations within the filter support, according to $w_1(m,n) = F_1(|f(i,j) - f(m,n)|)$, and the motion field at the current location may be filtered 30 according to the local weighted averaging filter:

$$u(i, j) = \frac{\sum_{m,n \in \Omega_{i,j}} w_1(m, n) u(m, n)}{\sum_{m,n \in \Omega_{i,j}} w_1(m, n)}$$

and $$v(i, j) = \frac{\sum_{m,n \in \Omega_{i,j}} w_1(m, n) v(m, n)}{\sum_{m,n \in \Omega_{i,j}} w_1(m, n)}.$$

A further determination 22 may be made as to whether or not there remain unfiltered locations in the motion field.

In alternative data-adaptive weighting embodiments of the present invention, a weight at a location $(m,n)$ may be determined based on a measure of confidence associated with a motion vector at $(m,n)$. According to embodiments of the present invention, a weighting function may associate a weight closer to 1.0 with a motion vector in the window wherein the motion vector is associated with a high confidence measure. The weighting function may associate a weight closer to 0.0 with a motion vector in the window wherein the motion vector is associated with a low confidence measure.

In some embodiments, a measure of confidence associated with a motion vector may be based on a motion-compensated pixel error. Many motion estimation algorithms may be based on a brightness constancy constraint, which may be stated as:

$$f(i,j) \approx g(i+u, j+v),$$

where the constraint may be based on the assumption that the intensity, or brightness, at a location $(i,j)$ is substantially preserved in the current image and the reference image. A linear brightness constancy constraint:

$$f(i,j) \approx \alpha g(i+u, j+v) + \beta$$

may be obtained by relaxing the brightness constancy constraint by assuming a gain factor $\alpha$ and an offset $\beta$ to be applied to the reference image.

In some embodiments of the present invention, a motion-compensated pixel error at a location $(m,n)$ may be computed by computing the difference between the pixel intensity, or color value, in the current image $f(m,n)$ and the motion-compensated pixel value in the reference image $g(m+u(m,n), n+v(m,n))$. Thus, the local motion-compensated error, which may be denoted $\epsilon(m,n)$, may be determined according to:

$$\epsilon(m,n) = |f(m,n) - g(m+u(m,n), n+v(m,n))|$$

in some embodiments of the present invention, and according to:

$$\epsilon(m,n) = |f(m,n) - \alpha g(m+u(m,n), n+v(m,n)) - \beta|$$

in alternative embodiments of the present invention. In some embodiments, the motion-compensated pixel value may require sub-pixel interpolation.

In alternative embodiments, the local motion-compensated error $\epsilon(m,n)$ at a location $(m,n)$ may be computed as a local average over a small neighborhood proximate to the location. In some embodiments of the present invention, the small neighborhood may be a 3×3 region centered at $(m,n)$. Exemplary alternative small neighborhoods may include a rectangular region of pixels centered at the pixel location $(m,n)$, a square region of pixels centered at the pixel location $(m,n)$, a symmetrical region centered at the pixel location $(m,n)$ and other regions. In these embodiments, $\epsilon(m,n)$ may be determined according to:

$$\varepsilon(m, n) = \sum_{i,j \in R_{m,n}} |f(i, j) - g(i + u(i, j), j + v(i, j))|,$$

where $R_{m,n}$ denotes the neighborhood associated with pixel location (m,n).

In still alternative embodiments, one motion vector may be associated with the neighborhood, and $\epsilon(m,n)$ may be determined according to:

$$\varepsilon(m, n) = \sum_{i,j \in R_{m,n}} |f(i, j) - g(i + u(m, n), j + v(m, n))|.$$

In some embodiments of the present invention, the confidence measure associated with motion vector at a location may be related to the local motion-compensated error determined at the location. The weighting values may be determined based on the confidence measure and the average motion-compensated pixel error (AME) value. The AME may be determined over a larger area than the local window associated with the location. In some embodiments, the AME may be determined over the entire frame. In general, the AME may be determined over a region, which may be denoted R, containing N pixels, according to:

$$AME = \left[ \frac{1}{N} \sum_{i,j \in R} (f(m, n) - g(m + u(m, n), n + v(m, n)))^2 \right]^{1/2}.$$

In alternative embodiments, other summary measures of the motion-compensated pixel error over a larger area may be used.

Figure 3:
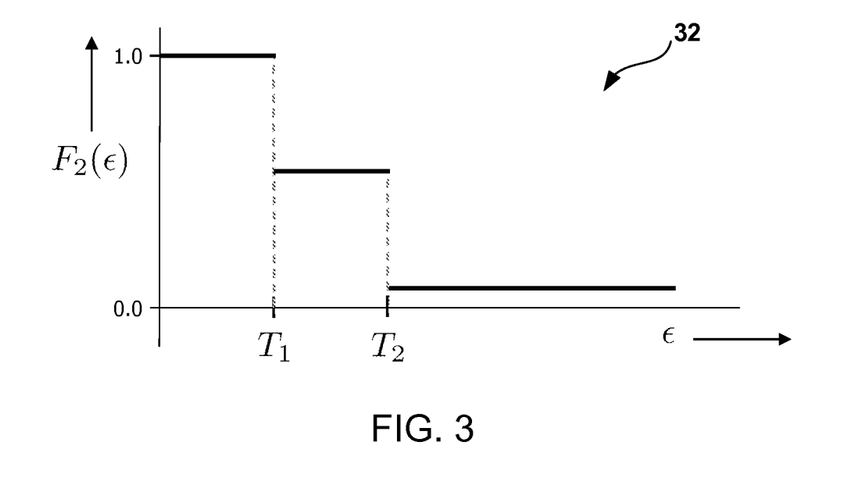
FIG. 3 is a picture illustrating a three-valued piecewise-constant functional relation.

In some embodiments, the local weighting function may be determined according to:

$$w_2(m,n) = F_2(\epsilon(m,n), AME),$$

where the functional relation $F_2(\cdot)$ may increase for values of $\epsilon$ that are small relative to AME. FIG. 3 illustrates an exemplary such function 32. In some embodiments, the weights may be based on a piecewise-constant function $F_2(\cdot)$ according to:

$$w_2(m, n) = \begin{cases} 1.0 & \text{if } \varepsilon(m, n) < K_1 \cdot AME \\ c_2 & \text{if } K_1 \cdot AME \leq \varepsilon(m, n) < K_2 \cdot AME \\ c_3 & \text{otherwise,} \end{cases}$$

where $K_1$ and $K_2$ may be pre-determined, fixed parameter values, and $c_2$ and $c_3$ maybe pre-determined, fixed weight values. In some embodiments, $K_1 \leq K_2$, and exemplary values may be $K_1=0.4$ and $K_2=0.8$. In some embodiments, $0.0 \leq c_3 \leq c_2 \leq 1.0$, and exemplary values may be $c_2=0.2$ and $c_3=0.0$. In alternative embodiments, the weights may be based on a piecewise-constant function $F_2(\cdot)$ comprising other than three distinct values. A piecewise-constant function may result in low computational expense and may require very few processing resources, while being effective. Accordingly, filtering according to embodiments of the present invention where weighting values may be determined based on the confidence measure and the AME value may result in suppressing motion vectors that may have a large error relative to the average error, AME, while propagating motion vectors that may have a small error relative to the AME. The use of the average value AME may provide filtering that is adaptive at a global level to the overall level of noise present in the video sequence.

Figure 4:
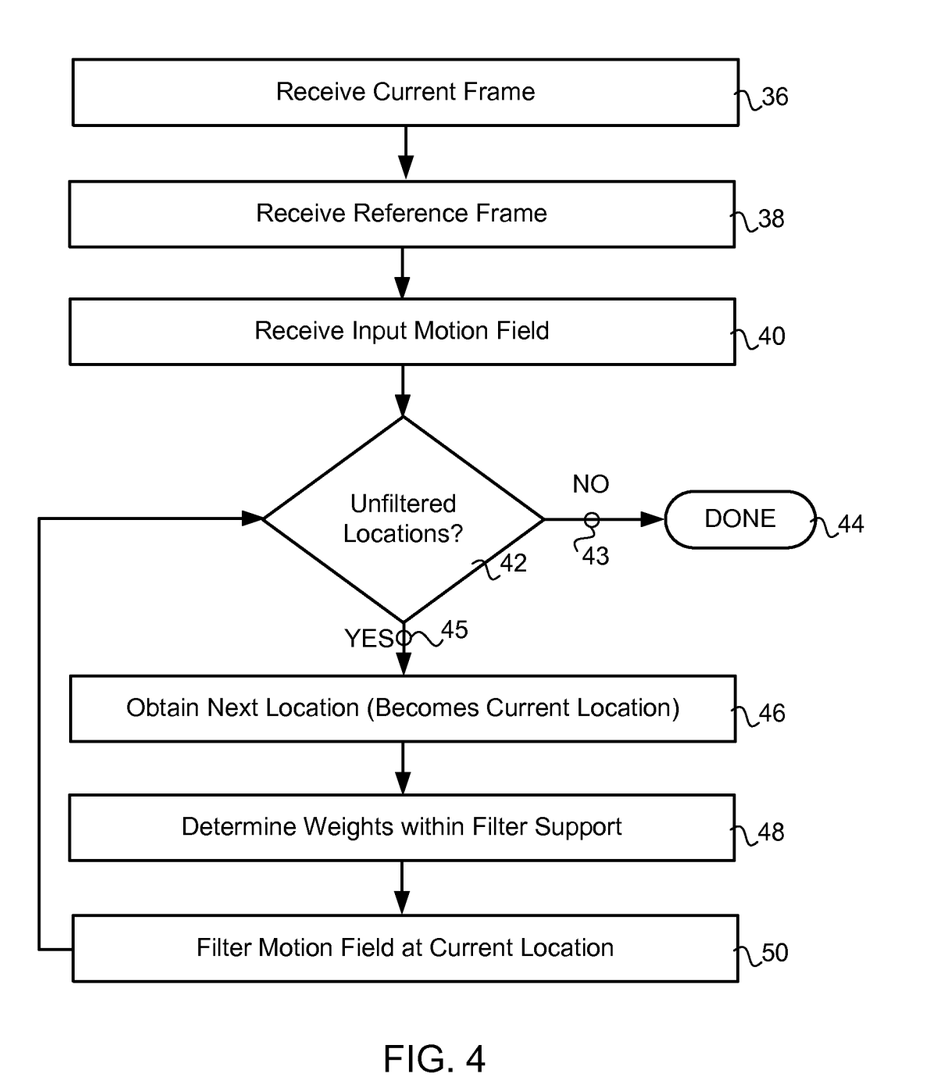
FIG. 4 is a chart showing exemplary embodiments of the present invention comprising determination of a data-adaptive weight at a location based on the confidence-measure value associated with the motion vector at the location.

Some embodiments of the present invention may be described in relation to FIG. 4. In these embodiments, a current frame, or image, may be received 36 in a computing system associated with a motion-field filter. A reference frame, or image, may be received 38 in the computing system. An input motion field may also be received 40 in the computing system. A determination 42 may be made as to whether or not there remain unfiltered locations in the motion field. If there are no 43 unfiltered locations, then the filtering may terminate 44. If there are remaining 45 unfiltered locations, then the next location may be obtained 46, and it may become the current location. Weights may be determined 48, for all locations within the filter support, according to $w_2(m,n)=F_2(\epsilon(m,n), AME)$, and the motion field at the current location may be filtered 50 according to the local weighted averaging filter:

$$u(i, j) = \frac{\sum_{m,n \in \Omega_{i,j}} w_2(m, n) u(m, n)}{\sum_{m,n \in \Omega_{i,j}} w_2(m, n)}$$

and $$v(i, j) = \frac{\sum_{m,n \in \Omega_{i,j}} w_2(m, n) v(m, n)}{\sum_{m,n \in \Omega_{i,j}} w_2(m, n)}.$$

A further determination 42 may be made as to whether or not there remain unfiltered locations in the motion field.

In some embodiments of the present invention, a weight may be a combination of $w_1(m,n)$ and $w_2(m,n)$. The combination should preserve the properties that individual weight values are between 0.0 and 1.0 and that higher weight values are associated with motion vectors where there is higher confidence in the motion vector value. In an exemplary embodiment, the combination may be formed according to:

$$w(m,n) = w_1(m,n) \cdot w_2(m,n).$$

In alternative embodiments, the combination may be formed according to:

$$w(m,n) = \min\{w_1(m,n), w_2(m,n)\}.$$

Figure 5:
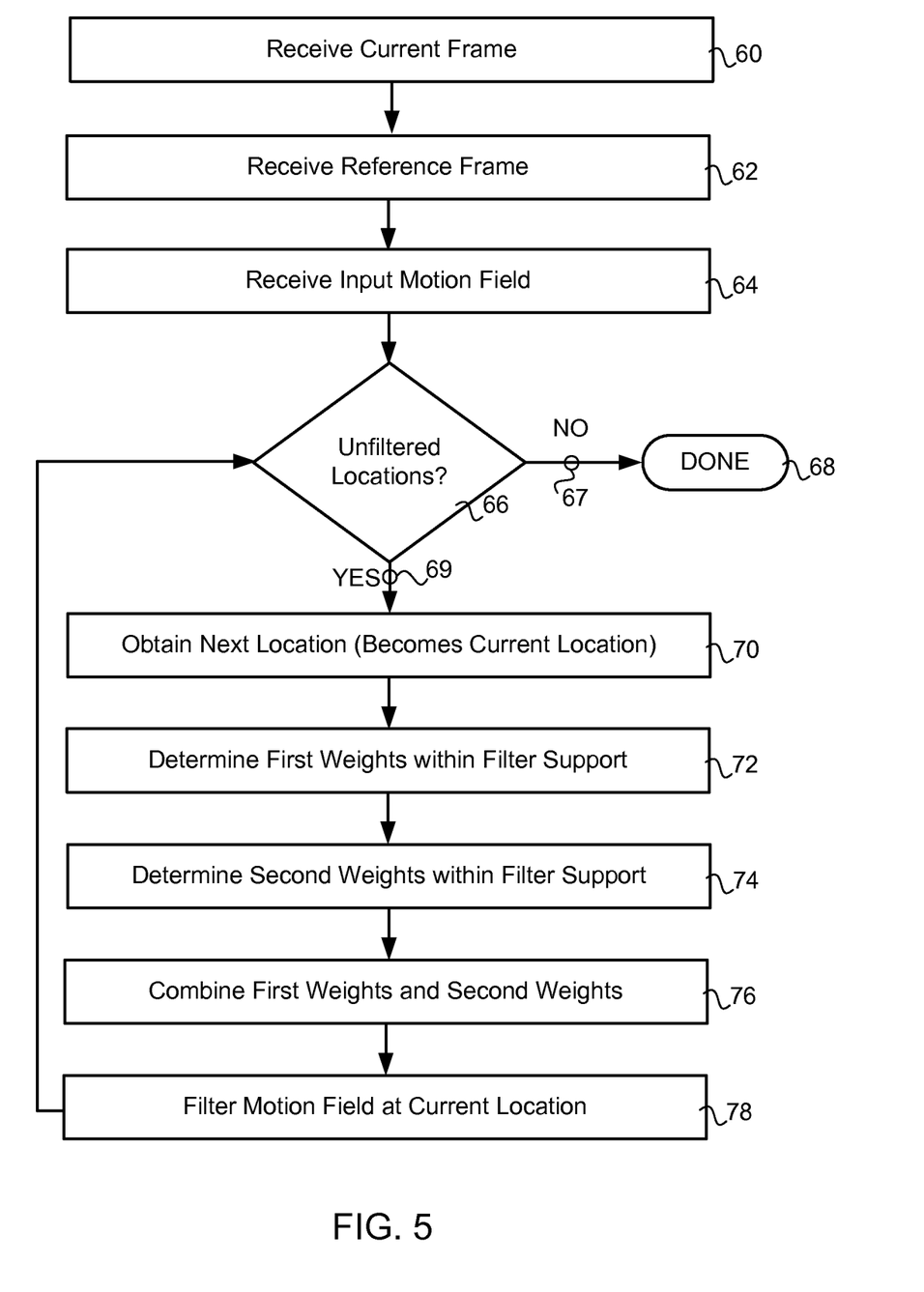
FIG. 5 is a chart showing exemplary embodiments of the present invention comprising determination of a first data-adaptive weight at a location based on the difference between the image value at the location and the image value at the center location in the filter support and a second data-adaptive weight at the location based on the confidence-measure value associated with the motion vector at the location, wherein the first data-adaptive weight at the location and the second data-adaptive weight at the location are combined to form the filter weight at the location.

Some embodiments of the present invention may be described in relation to FIG. 5. In these embodiments, a current frame, or image, may be received 60 in a computing system associated with a motion-field filter. A reference frame, or image, may be received 62 in the computing system. An input motion field may also be received 64 in the computing system. A determination 66 may be made as to whether or not there remain unfiltered locations in the motion field. If there are no 67 unfiltered locations, then the filtering may terminate 68. If there are remaining 69 unfiltered locations, then the next location may be obtained 70, and it may become the current location. A first weight may be determined 72 according to $w_1(m,n)=F_1(|f(i,j)-f(m,n)|)$ for all locations, (m,n), within the filter support, and a second weight may be determined 74 according to $w_2(m,n)=F_2(\epsilon(m,n), AME)$ for all locations, (m,n), within the filter support. The weights may be combined 76, and the motion field at the current location may be filtered 78 according to the local weighted averaging filter:

$$u(i, j) = \frac{\sum_{m,n \in \Omega_{i,j}} w(m, n) u(m, n)}{\sum_{m,n \in \Omega_{i,j}} w(m, n)}$$

and $$v(i, j) = \frac{\sum_{m,n \in \Omega_{i,j}} w(m, n) v(m, n)}{\sum_{m,n \in \Omega_{i,j}} w(m, n)},$$

where w(m,n) may denote a combined weight. A further determination 66 may be made as to whether or not there remain unfiltered locations in the motion field.

In alternative embodiments, additional weights may be combined to form a combined weight.

The local weighted averaging filter may be implemented, in some embodiments, as a pure non-recursive filter where each output motion vector may be computed from motion vectors from the input motion field only. In alternative embodiments, the local weighted averaging filter may be implemented as a causal recursive filter. In these embodiments, an output motion vector may be computed using the input motion field for locations in the filter support which have not been filtered, but using the output motion field for locations in the filter support which have been filtered. This may be referred to as in-place filtering. Alternative implementations of the local weighted averaging filter may be realized according to techniques and approaches know in the art.

Figure 6:
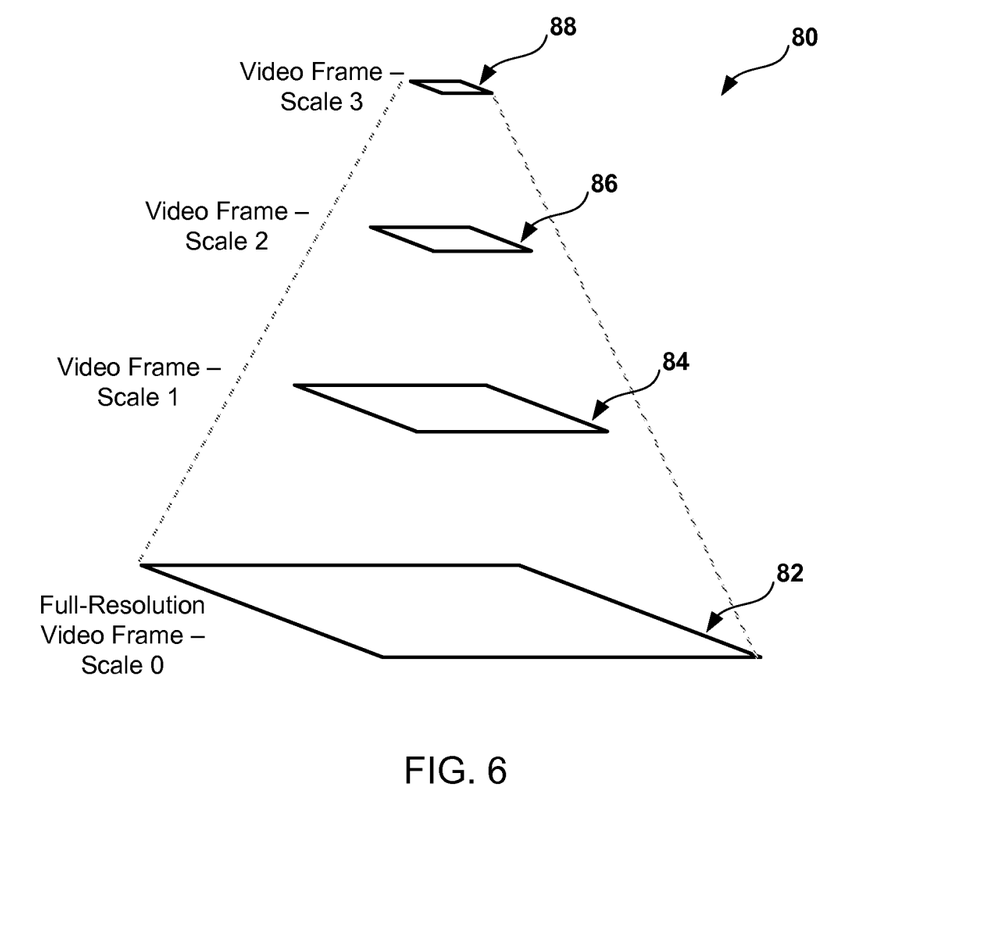
FIG. 6 is a picture showing an exemplary multi-scale representation of an image.

Some embodiments of the present invention may comprise methods and systems for motion estimation. Some of these embodiments may be described in relation to a general multi-scale motion estimation method or system which may be understood in relation to FIG. 6. A multi-scale, also referred to as a hierarchical motion estimation method or system, may use a pyramid representation 80 of the image data associated with a video frame. The pyramid representation 80 may comprise successively lower resolution frames (three shown, 88, 86, 84) associated with a full-resolution frame 82. In a multi-scale motion estimation method or system, a pyramid representation of a current frame f(x,y) and a pyramid representation of a reference frame g(x,y) may be generated. The motion estimation process may proceed by estimating an initial motion field at the lowest-resolution scale (for example, 88). The initial, coarse, motion field may be subsequently refined and improved at successively higher-resolution scales (for example, 86, 84, 82) using the image data at that scale, also referred to as level, of the pyramid. The refinement process at a level may use the estimate of the motion field generated at the previous level, and may compute an update, or an incremental, motion vector. Depending on the motion estimation approach, the information from a previous scale may be used in a variety of manners. The refinement process may continue until a motion field has been computed at the highest-resolution scale. In some embodiments of the present invention, a multi-resolution motion estimation method or system may comprise motion-field filtering according to the embodiments of the present invention described herein.

Figure 7:
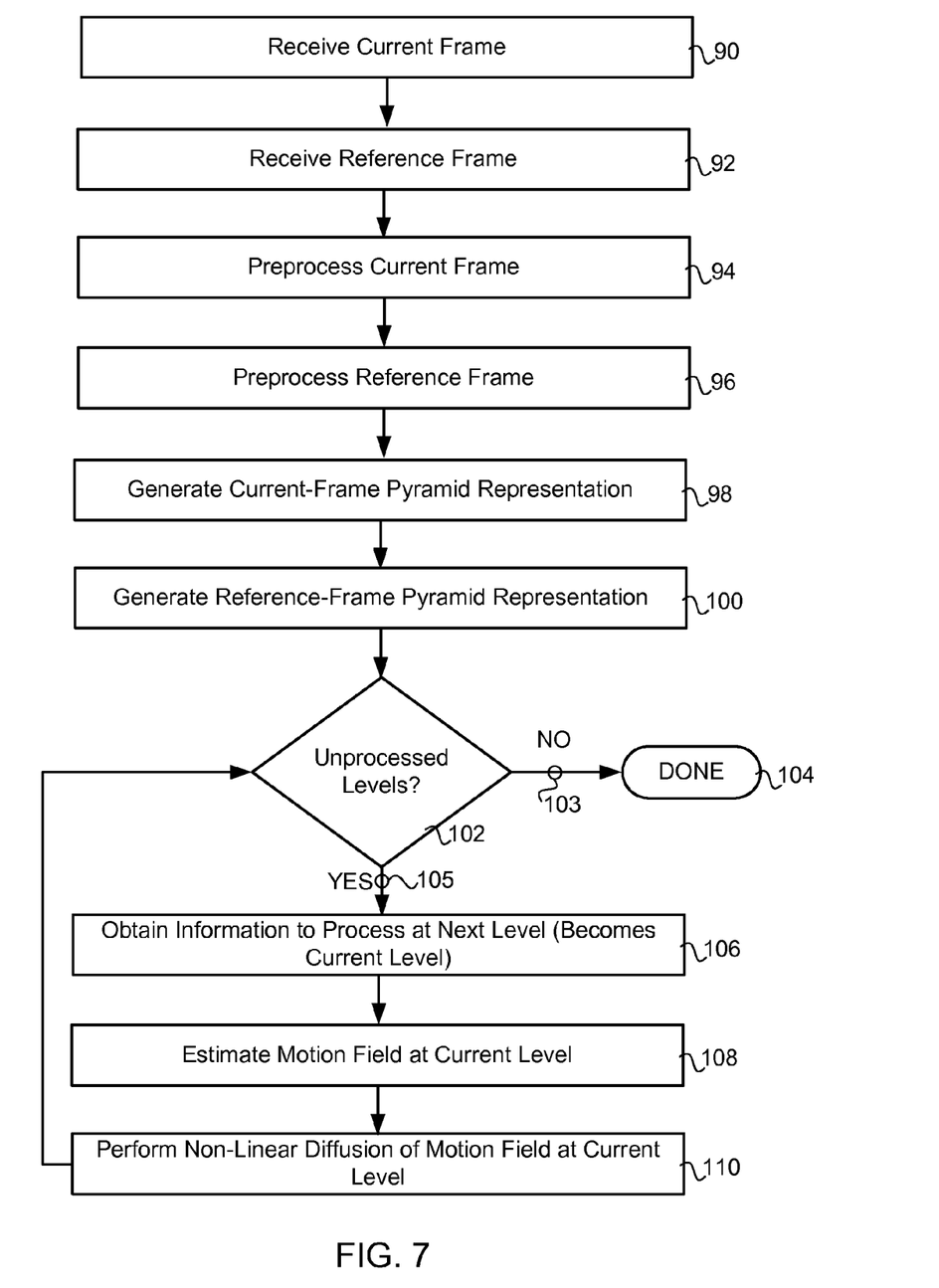
FIG. 7 is a chart showing exemplary embodiments of the present invention comprising multi-scale motion estimation incorporating nonlinear diffusion filtering according to embodiments of the present invention.

Some embodiments of the present invention may be described in relation to FIG. 7. In these embodiments, a current frame, or image, may be received 90 in a computing system associated with a motion-field estimator. A reference frame, or image, may be received 92 in the computing system. The current frame and the reference frame may be preprocessed 94, 96. Exemplary preprocessing may comprise color conversion and other image normalization processing. In alternative embodiments, preprocessing may not be performed. A pyramid representation associated with the current frame may be generated 98, and a pyramid representation associated with the reference frame may be generated 100. The number of levels in the pyramid representations may be predetermined in some embodiments or may be determined based on characteristics of the input frames in alternative embodiments. In an exemplary embodiment, a full-resolution level may correspond to 1920×1080 pixels; a first lower-resolution level may correspond to 960×540 pixels; a second lower-resolution level may correspond to 480×270 pixels; and a coarsest-resolution level may correspond to 240×135 pixels. The number of pyramid levels shown in FIG. 6 and described in the exemplary embodiment above is for illustrative purposes only. It is understood that the pyramid representation may comprise fewer or more levels than shown in these examples. A determination 102 may be made as to whether or not there remain unprocessed levels. If there are no 103 unprocessed levels, then the estimation may terminate 104. If there are remaining 105 unprocessed levels, then the information required to process at the next level may be obtained 106, and it may become the current level. The motion field may be estimated 108 at the current level. At the coarsest level, an initial motion field maybe estimated. At subsequent levels, a motion field update may be estimated in some embodiments, or a refined motion field estimate may be estimated in alternative embodiments. Nonlinear diffusion of the currently computed motion field may be performed 110, and a further determination 102 may be made as to whether or not there remain unprocessed levels in the motion field. The original intensity, or color data, associated with the current frame and the reference frame may be provided for determination of the data-adaptive filtering weights in the nonlinear diffusion. Additionally, an estimate of confidence in each motion vector may be provided in the nonlinear diffusion step. In some embodiments, the confidence in each motion vector may be generated during motion estimation.

In some embodiments of the present invention, motion estimation at a given level may be performed according to the methods and systems described in U.S. patent application Ser. No. 12/543,597, entitled "Methods and Systems for Motion Estimation in a Video Sequence," filed on Aug. 19, 2009, and which is hereby incorporated by reference herein in its entirety. Other exemplary motion estimation methods and systems may include block-matching methods and systems and gradient-based methods and systems, for example, Lucas and Kanade based methods and systems, phase correlation methods and systems and other motion estimation methods and systems known in the art which may be used in a multi-scale framework. For example, for block-matching methods and systems, the motion vectors from a previously processed lower-resolution scale may be used to initialize a search for a best matching motion vector at a current level. Additionally, in these embodiments, the search region may be constrained based on the initialized estimate. In a gradient-based method or system, a previous estimate of the motion field may be used to warp one of either the current frame or the reference frame to make it more similar to the other of either the current frame or the reference frame. In the subsequent motion estimation steps, the warped image may replace the image data of one of the frames so that an incremental motion vector may be computed.

In some embodiments of the present invention, nonlinear diffusion filtering may be performed multiple times at each level. In an exemplary embodiment, nonlinear diffusion filtering may be performed a pre-determined number of times at a level. In alternative embodiments, nonlinear diffusion filtering may be performed at a level until the smoothed motion field meets a first criterion or exceeds a pre-determined number of times.

In some embodiments of the present invention, motion estimation may be performed multiple times at a single scale with each subsequent motion field at the scale being based on the filtered motion field previously determined.

Although the charts in FIGS. 2, 4, 5 and 7 show a specific order of execution, it is understood that the order of execution may differ from that which is depicted. For example, the order of execution of the blocks may be changed relative to the shown order. Also, as a further example, two or more blocks shown in succession in the figure may be executed concurrently, or with partial concurrence. It is understood by those with ordinary skill in the art that software, hardware and/or firmware may be created by one of ordinary skill in the art to carry out the various logical functions described herein.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for filtering a motion-vector field, said method comprising:
   receiving, in a computing system, a current frame;
   receiving, in said computing system, a motion-vector field associated with said current frame, wherein each location in said motion-vector field is associated with a location in said current frame;
   determining a weight value for each location in a region in said motion-vector field, wherein:
      said region is substantially centered at a window-center location in said motion-vector field; and
      a weight value for a location in said region in said motion-vector field is based on a functional relation dependent on an absolute difference between an image value associated with said associated location in said current frame and an image value associated with said associated window-center location in said current frame; and
   filtering said motion-vector field at said window-center location using said weight values determined for each location in said region.

2. The method as described in claim 1, wherein:
   said weight value for said location in said region comprises a first value when said absolute difference meets a criterion; and
   said weight value for said location in said region comprises a second value when said absolute difference does not meet said criterion.

3. The method as described in claim 2, wherein:
   said criterion is said absolute difference is less than a threshold value;
   said first value is one; and
   said second value is a constant value in a closed interval from zero to one.

4. The method as described in claim 1, wherein said functional relation is a piecewise-constant function.

5. The method as described in claim 1, wherein said functional relation is decreasing as the absolute difference increases.

6. The method as described in claim 1, wherein said filtering is a non-recursive filtering.

7. The method as described in claim 1, wherein said filtering is a causal recursive filtering.

8. The method as described in claim 1, wherein said location in said current frame associated with said location in said motion-vector field is associated with a plurality of pixels in said current frame.

9. A method for filtering a motion-vector field, said method comprising:
   receiving, in a computing system, a motion-vector field;
   receiving, in said computing system, a confidence-measure value for each motion vector in said motion-vector field;
   determining a first weight value for each location in a region in said motion-vector field, wherein:
      said region is substantially centered at a window-center location; and
      a first weight value for a location in said region is based on a first functional relation dependent on said confidence-measure value associated with said motion vector at said location; and
   filtering said motion-vector field at said window-center location using said first weight values determined for each location in said region.

10. The method as described in claim 9, wherein said confidence-measure values are computed during a motion estimation process.

11. The method as described in claim 9 further comprising:
   receiving, in said computing system, a current frame associated with said motion-vector field, wherein each location in said motion-vector field is associated with a location in said current frame;
   receiving, in said computing system, a reference frame associated with said motion-vector field, wherein each motion vector in said motion-vector field is associated with a location in said reference frame;
   wherein said receiving said confidence-measure values for each motion vector in said motion-vector field comprises calculating a motion-compensated error at each location in said region;
   calculating an average motion-compensated error over an area in said current frame and said reference frame, wherein said area is larger than said region; and
   wherein said first weight value for a location in said region is computed using said motion-compensated error at said location and said average motion-compensated error.

12. The method as described in claim 11, wherein:
   said first weight value for said location in said region comprises a first value when said motion-compensated error at said location and said average motion-compensated error meet a first criterion;
   said first weight value for said location in said region comprises a second value when said motion-compensated error at said location and said average motion-compensated error meet a second criterion; and
   said first weight value for said location in said region comprises a third value when said motion-compensated error at said location and said average motion-compensated error do not meet said first criterion and said second criterion.

13. The method as described in claim 11, wherein said location in said current frame associated with said location in said motion-vector field is associated with a plurality of pixels in said current frame.

14. The method as described in claim 9, wherein said first functional relation is a piecewise-constant function.

15. The method as described in claim 9 further comprising:
determining a second weight value for each location in said region in said motion-vector field, wherein:
a second weight value for a location in said region is based on a second functional relation dependent on an absolute difference between an image value associated with said associated location in said current frame and an image value associated with said associated window-center location in said current frame;
combining said first weight value for a location in said region with said second weight value for a location in said region; and
wherein said filtering said motion-vector field at said window-center location using said first weight values determined for each location in said region further comprises using said combined weight values determined for each location in said region.

16. The method as described in claim 15, wherein said combining said first weight value for a location in said region with said second weight value for a location in said region comprises multiplying said first weight value for a location in said region with said second weight value for a location in said region.

17. The method as described in claim 15, wherein said combining said first weight value for a location in said region with said second weight value for a location in said region comprises determining the minimum value of said first weight value for a location in said region with said second weight value for a location in said region.

18. The method as described in claim 15, wherein:
said second weight value for said location in said region comprises a first value when said absolute difference meets a criterion; and
said second weight value for said location in said region comprises a second value when said absolute difference does not meet said criterion.

19. The method as described in claim 15, wherein said second functional relation is a piecewise-constant function.

20. The method as described in claim 15, wherein said filtering is a non-recursive filtering.

21. The method as described in claim 15, wherein said filtering is a causal recursive filtering.

22. The method as described in claim 9, wherein said filtering is a non-recursive filtering.

23. The method as described in claim 9, wherein said filtering is a causal recursive filtering.

24. A method for estimating a motion-vector field, said method comprising:
receiving, in a computing system, a current frame;
receiving, in said computing system, a reference frame;
estimating a motion-vector field associated with said current frame and said reference frame, wherein each motion vector in said motion-vector field is associated with a location in said current frame and a location in said reference frame;
determining a weight value for each location in a region in said motion-vector field, wherein:
said region is substantially centered at a window-center location; and
a weight value for a location in said region is based on a functional relation dependent on an absolute difference between an image value associated with said associated location in said current frame and an image value associated with said associated window-center location in said current frame; and
filtering said motion-vector field at said window-center location using said weight values determined for each location in said region.

25. The method as described in claim 24, wherein said location in said current frame associated with said motion vector in said motion-vector field is associated with a plurality of pixels in said current frame.

26. A method for estimating a motion-vector field, said method comprising:
receiving, in a computing system, a current frame;
receiving, in said computing system, a reference frame;
estimating a motion-vector field associated with said current frame and said reference frame, wherein each motion vector in said motion-vector field is associated with a location in said current frame and a location in said reference frame;
receiving, in said computing system, a confidence measure value for each motion vector in said motion-vector field;
determining a first weight value for each location in a region in said motion-vector field, wherein:
said region is substantially centered at a window-center location; and
a first weight value for a location in said region is based on a first functional relation dependent on said confidence measure value associated with said motion vector at said location; and
filtering said motion-vector field at said window-center location using said first weight values determined for each location in said region.

27. The method as described in claim 26 further comprising:
determining a second weight value for each location in said region in said motion-vector field, wherein:
a second weight value for a location in said region is based on a second functional relation dependent on an absolute difference between an image value associated with said associated location in said current frame and an image value associated with said associated window-center location in said current frame;
combining said first weight value for a location in said region with said second weight value for a location in said region; and
wherein said filtering said motion-vector field at said window-center location using said first weight values determined for each location in said region further comprises using said combined weight values determined for each location in said region.

28. The method as described in claim 26, wherein said location in said current frame associated with said motion vector in said motion-vector field is associated with a plurality of pixels in said current frame.

* * * * *